M. BYRNE.

HEEL CUSHION.

APPLICATION FILED JAN. 28, 1909.

Reissued Sept. 6, 1910. 13,150.

Inventor

Witnesses

Elizabeth Guppitt

Halbert P. Brown

Matthew Byrne

By Church & Church his Attorneys

UNITED STATES PATENT OFFICE.

MATTHEW BYRNE, OF SAN FRANCISCO, CALIFORNIA.

HEEL-CUSHION.

13,150. Specification of Reissued Letters Patent. Reissued Sept. 6, 1910.

Original No. 897,874, dated September 8, 1908, Serial No. 331,764. Application for reissue filed January 28, 1909. Serial No. 474,888.

*To all whom it may concern:*

Be it known that I, MATTHEW BYRNE, a citizen of the United States, residing at San Francisco, in the county of San Francisco and State of California, have invented certain new and useful Improvements in Heel-Cushions; and I do declare the following to be a full, clear, and exact description of the invention, such as will enable others skilled in the art to which it appertains to make and use the same.

This invention relates to improvements in pneumatic cushions for use in boots or shoes, especially the heel portions of the same, and it consists in the construction, combination and arrangement of parts, hereinafter described and claimed.

The object of the invention is to provide a heel cushion of this character, in which the rubber body or fabric is provided with air-tight or hermetically-sealed cells, whereby the cushioning or elastic action of the device will be greatly increased.

The above and other objects, which will appear as the nature of my invention is better understood, are accomplished by means of the construction illustrated in the accompanying drawings, in which—

Figure 1:
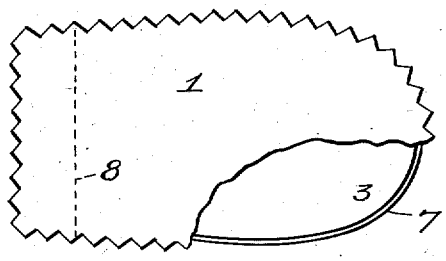
Figure 2:
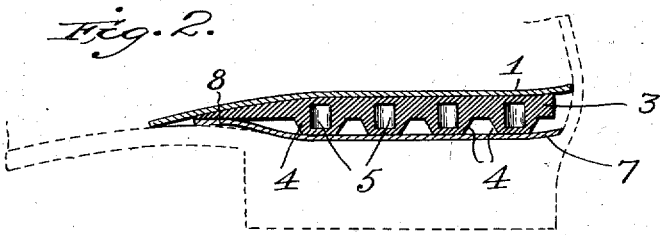
Figure 3:
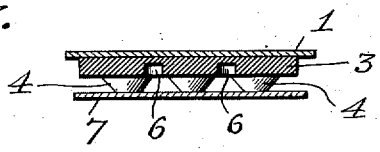
Figure 4:
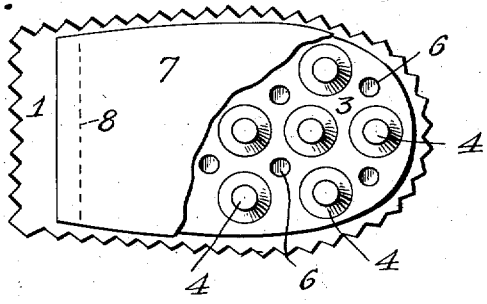

Figure 1 is a top plan view of the improved pneumatic heel cushion; Figs. 2 and 3 are respectively longitudinal and transverse sectional views through the same; and Fig. 4 is a bottom plan view of the cushion.

The present embodiment of the invention comprises a tread lift 1, preferably of leather, and shaped to fit the heel and shank portions of the shoe in which it is used. To the under side of this lift or layer 1 is attached the cushion proper which comprises a body of rubber suitably constructed and constituted to provide a series of separated, downwardly-extending, conical projections 4, each of which projections incloses an individual air-tight or hermetically-sealed cell or chamber 5. As shown in Fig. 2, this cushion is made up of a soft rubber fabric or sheet 3, from the bottom of which extend a plurality of said hollow projections 4 which are represented as frusto-conical in form. The cavities 5 are hermetically sealed being entirely surrounded by the elastic walls formed by the impervious rubber. It will be seen that when the cushion is in use, these projections will be partially collapsed and the air within the same will be compressed to increase the elasticity of the rubber, and the cushioning action of the device. Any number of the projections may be provided and arranged between them in the sheet or body 3, are small cavities or recesses 6, which are open at the bottom of the rubber body, as seen in Fig. 3. The cushion is preferably retained in the shoe by a retaining strip or layer 7, which is adapted to be glued or cemented in the shoe. A transverse row of stitching 8 is preferably used for securing the three parts or layers of the device together.

The use of the invention is clearly shown in Fig. 2 of the drawing. It will be observed that the provision of the cells or cavities 5 in the rubber body or fabric greatly increases the cushioning action of the device, and renders the rubber more elastic.

It will be understood that the projections 4 spread laterally under the pressure on the cushion, and hence tend to expand the cushion laterally. The openings 6 contract under such pressure and hence compensate for such expansive force and correspondingly add to the elasticity of the cushion.

Having thus described my invention, what I claim as new, and desire to secure by Letters Patent, is—

1. A heel cushion for shoes comprising a relatively thick body having a plurality of frusto-conical projections depending from its lower face, hermetically-closed vertically disposed air-chambers arranged in each of the several projections of the body, a forwardly projecting tongue carried by said body, upwardly extending wells formed in the lower face of said body between said air cells, a retaining strap cemented in the shoe beneath said body, a pliable tread lift applied over said body, and a transverse row of stitching passing through the lift, the tongue and the retaining strap, said tread lift projecting beyond the tongue and lying well over the instep of the shoe.

2. A cushion for the inside of a shoe comprising a flexible and elastic sheet-like body of impervious material shaped to fit the inside of the shoe and having a multiplicity of small individual projections extending downwardly from its under surface and integral therewith, each of said projections having therein a hermetically-sealed air chamber whereby a series of separated pneumatic cushions having elastic walls extending below the sheet-like body are provided.

3. A cushion for the inside of a shoe comprising an upper layer of leather and a sheet-like body of soft rubber secured to the underside of said leather layer and having a multiplicity of individual projections spaced apart and integral with said rubber sheet and extending downwardly from its under surface, each of said projections having elastic walls and inclosing a cavity within the walls, the said cavities being connected across the top by the material of which the pad is formed to prevent spreading of the walls, the material above the cavities and the walls together serving to hermetically seal said cavities and confine the air therein.

4. A heel cushion for the inside of a shoe comprising a pliable sheet-like body of soft rubber shaped to fit the inside of the shoe and having a multiplicity of individual projections spaced apart and integral therewith extending downwardly from its under surface, each of said projections having elastic walls and a hermetically sealed internal air chamber, and said sheet-like body having cut out portions therein intermediate the projections to provide expansion spaces for the walls of the chambers.

5. A heel cushion for the inside of a shoe comprising a pliable upper layer of leather shaped to fit the inside of the shoe and a sheet-like body of soft rubber secured to the underside of the upper layer and having a multiplicity of individual projections spaced apart and integral therewith extending downwardly from its under surface, each of said projections having elastic walls and a single hermetically sealed internal air chamber, and said sheet-like body having cut-out portions therein intermediate the projections to provide expansion space for the walls of the chambers.

In witness whereof I have hereunto set my hand in presence of two subscribing witnesses.

MATTHEW BYRNE.

Witnesses:
CHARLES EDELMAN,
E. B. DAVENPORT.